United States Patent
Scratchley et al.

(10) Patent No.: US 7,372,318 B2
(45) Date of Patent: *May 13, 2008

(54) PRECISION, LOW DRIFT, STACKED VOLTAGE REFERENCE

(75) Inventors: Douglas A. Scratchley, St. Petersburg, FL (US); Charles F. Hayek, Seminole, FL (US); Ernest Frank John Graetz, Largo, FL (US)

(73) Assignee: Honeywell International Inc., Morristown, NJ (US)

( * ) Notice: Subject to any disclaimer, the term of this patent is extended or adjusted under 35 U.S.C. 154(b) by 90 days.

This patent is subject to a terminal disclaimer.

(21) Appl. No.: 10/899,706

(22) Filed: Jul. 26, 2004

(65) Prior Publication Data

US 2006/0017493 A1    Jan. 26, 2006

(51) Int. Cl.
*H02M 7/25* (2006.01)
*H02M 3/18* (2006.01)
*G05F 3/08* (2006.01)

(52) U.S. Cl. .................... 327/536; 327/331; 363/59
(58) Field of Classification Search ............... None
See application file for complete search history.

(56) References Cited

U.S. PATENT DOCUMENTS

| | | | |
|---|---|---|---|
| 3,818,484 A * | 6/1974 | Nakamura et al. | 368/204 |
| 3,869,659 A * | 3/1975 | Doong et al. | 363/60 |
| 4,222,003 A | 9/1980 | Kline | |
| 4,481,566 A * | 11/1984 | Hoffman et al. | 363/60 |
| RE35,121 E * | 12/1995 | Olivo et al. | 363/60 |
| 5,642,072 A | 6/1997 | Miyamoto et al. | |
| 6,130,572 A * | 10/2000 | Ghilardelli et al. | 327/536 |
| 6,370,046 B1 | 4/2002 | Nebrigic et al. | |
| 6,518,828 B2 * | 2/2003 | Seo et al. | 327/534 |
| 6,614,102 B1 | 9/2003 | Hoffman et al. | |
| 2002/0093318 A1 | 7/2002 | Wallis | |
| 2004/0080964 A1 * | 4/2004 | Buchmann | 363/60 |
| 2004/0110330 A1 | 6/2004 | Collard | |
| 2005/0052220 A1 * | 3/2005 | Burgener et al. | 327/536 |

FOREIGN PATENT DOCUMENTS

| | | |
|---|---|---|
| EP | 0 349 495 A2 | 1/1990 |
| EP | 0 382 929 A2 | 8/1990 |
| EP | 0818875 | 1/1998 |
| GB | 2226664 | 7/1990 |

OTHER PUBLICATIONS

"High Precision 10V IC Reference," *Analog Devices Data Sheet*, Jan. 2000, pp. 1-6.

* cited by examiner

*Primary Examiner*—N. Drew Richards
*Assistant Examiner*—Terry L. Englund
(74) *Attorney, Agent, or Firm*—Fogg & Powers LLC

(57) ABSTRACT

A voltage reference circuit receives an input voltage at a first port and a time varying input signal at a second port. The voltage reference circuit includes a switching circuit that is responsive to the first and second ports, and that generates an AC signal from the input voltage. The voltage reference circuit further includes a voltage multiplier circuit, coupled to the switching circuit to receive the AC signal and to create a DC signal with a selected voltage level. The voltage reference circuit further includes a plurality of voltage reference modules, coupled together to form a voltage reference stack, and coupled to the voltage multiplier circuit to receive the selected voltage level and output a precise reference voltage.

32 Claims, 7 Drawing Sheets

Fig. 3 (Switching Circuit)

Fig. 4 (Voltage Multiplier)

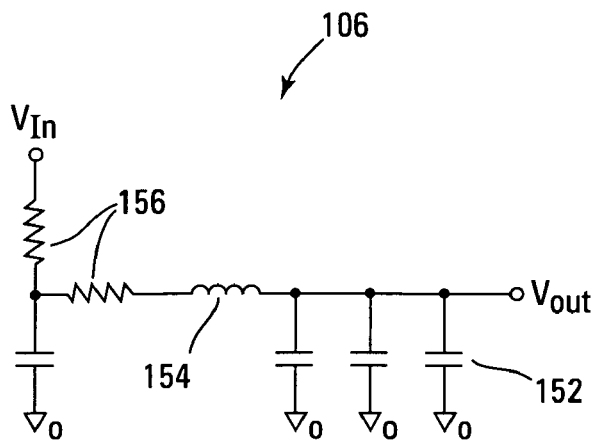
Fig. 6A (Filter for $V_{cc}$)
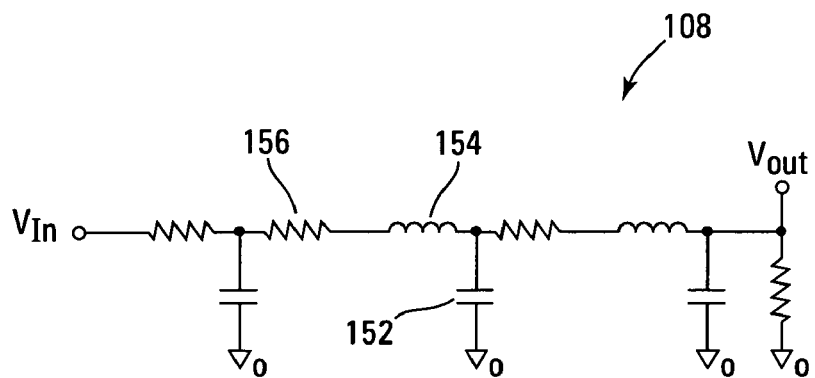
Fig. 6B (Filter for Output)
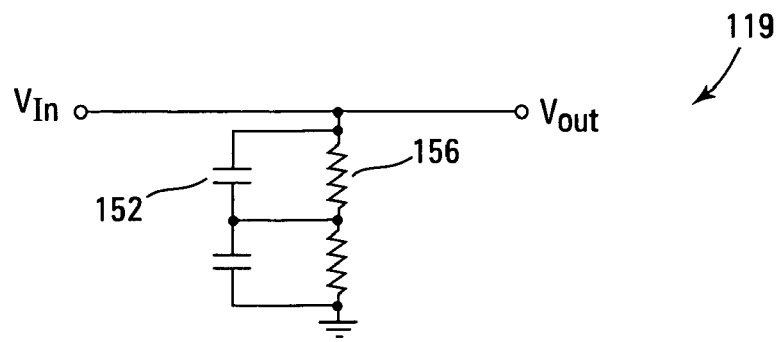
Fig. 6C (Intermediate Filter)

PRECISION, LOW DRIFT, STACKED VOLTAGE REFERENCE

TECHNICAL FIELD

The following description relates generally to the field of electronic circuits, and more particularly to a precision, low drift, stacked reference voltage.

BACKGROUND

Voltage references are used pervasively throughout electronics applications. They are used to supply stable unvarying voltages to other systems and circuits. For circuits such as instrumentation and test equipment, data acquisition systems, portable devices, medical equipment, analog to digital converters, digital to analog converters, and sensors, precision voltage references constitute critical circuit elements.

Common problems that voltage references encounter comprise shifts in the output voltage. For example, a voltage reference may shift due to changing thermal conditions. Furthermore, a voltage reference is also susceptible to lifetime shifts, known as long term voltage drift, that occur gradually as systems and circuits are used. These problems can be exacerbated if the reference voltage circuit is designed to consume a minimum of power supply current. Many reference voltage circuits are also susceptible to voltage changes due to radiation. Where a voltage reference circuit is to be used in a radiation rich environment, maintaining the stability of the reference voltage becomes increasingly problematic.

Voltage references also suffer from other common limitations. For example, many voltage references are normally only used with small stable loads. Other voltage references are incapable of providing a stable high voltage output. Few voltage references can provide a load above a few milliamps and still maintain a stable precision output voltage. This introduces problems where larger loads are desirable or necessary. It also restricts or prohibits the use of reference voltage circuits where a changing load is necessary.

One application in which the mentioned problems are encountered is that of sensor equipment used where the atmosphere is thin or nonexistent, such as in space. Sensors require tight tolerances for their reference voltages to accurately detect the required phenomena. Therefore, even slight variations in the reference voltage may be unacceptable. A combination of the above design problems makes the use of reference voltages in high radiation environments problematic, particularly when used in sensor circuits. Therefore, there exists a need in the art for extremely stable, precise, high voltage references. This need is magnified in certain applications such as those used in space.

SUMMARY

In one embodiment, the invention advantageously provides a voltage reference circuit. The voltage reference circuit includes a first port, adapted to receive an input voltage; a second port, adapted to receive a time varying input signal; and a switching circuit, responsive to the first and second ports. The switching circuit generates an AC signal from the input voltage. The voltage reference circuit further includes a voltage multiplier circuit, coupled to the switching circuit to receive the AC signal and to create a DC signal with a selected voltage level; and a plurality of voltage reference modules. The plurality of voltage reference modules are coupled together to form a voltage reference stack, and coupled to the voltage multiplier circuit to receive the selected voltage level and output a precise reference voltage.

Another aspect of the invention provides an electronic device that comprises an electronic circuit attached to a voltage reference circuit. The voltage reference circuit includes a first port adapted to receive an input voltage; a second port adapted to receive a time varying input signal; and a switching circuit, responsive to the first and second ports. The switching circuit generates an AC signal from the input voltage. The voltage reference circuit further includes a voltage multiplier circuit, coupled to switching circuit to receive the AC signal and to create a DC signal with a selected voltage level; and a plurality of voltage reference modules. The plurality of voltage reference modules are coupled together to form a voltage reference stack, and coupled to the voltage multiplier circuit to receive the selected voltage level and output a precise reference voltage.

Another aspect of the invention provides a method for supplying a reference voltage. The method comprises generating an alternating current signal from a direct current input voltage and time varying input signal by means of a switching circuit; generating a DC voltage signal from the alternating current signal that is greater in magnitude than the direct current input voltage; inputting the DC voltage signal into a plurality of stacked voltage reference modules; and delivering an output voltage from the plurality of stacked voltage reference modules.

Another aspect of the invention provides a voltage reference apparatus. The voltage reference apparatus includes a switching circuit that generates an AC signal from a DC input and a time varying input signal. The voltage reference apparatus further includes a voltage multiplier circuit, coupled to the output of the switching circuit, that receives the AC output and generates a DC signal with a selected voltage level. The voltage reference circuit further includes a plurality of voltage reference modules. The plurality of voltage reference modules are coupled together to form a voltage reference stack, and coupled to the voltage multiplier circuit. The plurality of voltage reference modules receives the DC signal with the selected voltage level and generates a precise reference voltage.

Another aspect of the invention provides a voltage reference circuit. The voltage reference circuit includes a first port, adapted to receive an input voltage; at least one input filter, coupled to the first port, that filters the input voltage; a second port, adapted to receive a time varying input signal; and a switching circuit, responsive to the first and the second ports. The switching circuit generates an AC signal from the input voltage. The voltage reference circuit further includes a voltage multiplier circuit. The voltage multiplier circuit is coupled to switching circuit to receive the AC signal and to create a DC signal with a selected voltage level. The voltage reference circuit further includes at least one intermediate filter. The at least one intermediate filter is coupled to the voltage multiplier circuit, and filters the DC signal with the selected output voltage level. The voltage reference circuit further includes a plurality of voltage reference modules that receives the filtered DC signal. The plurality of voltage reference modules are coupled together to form a voltage reference stack, and coupled to the voltage multiplier circuit. The voltage reference circuit further includes an output port that is adapted to provide an output voltage; and at least one output filter, coupled to the output port, that filters the output voltage.

Another aspect of the invention provides a voltage reference apparatus. The voltage reference apparatus includes a switching circuit that generates an AC signal from a DC input and a time varying input signal. The voltage reference apparatus further includes a voltage multiplier circuit, coupled to the output of the switching circuit. The voltage multiplier circuit receives the AC output and generates a DC signal with a selected voltage level. The voltage reference apparatus further includes a plurality of voltage reference modules that generates a precise voltage output at an output port. The plurality of voltage reference modules are coupled together to form a voltage reference stack, and coupled to the voltage multiplier circuit. The voltage reference apparatus further includes a plurality of filters, coupled to the voltage reference apparatus at one or more locations.

Another aspect of the invention provides a method for supplying a reference voltage. The method comprises introducing a direct current input voltage; filtering the direct current input voltage; introducing a time varying input signal; generating an alternating current signal from the filtered direct current input voltage and the time varying input signal; generating a DC voltage signal from the alternating current signal that is greater in magnitude than the direct current input voltage; filtering the generated DC voltage; inputting the filtered DC voltage into a plurality of stacked voltage reference modules; generating a precise reference voltage in the plurality of stacked voltage reference modules; and delivering the regulated DC voltage.

DRAWINGS

FIG. 6a is a circuit diagram of an input filter in accordance with an embodiment of the present invention;

FIG. 6b is a circuit diagram of an output filter in accordance with an embodiment of the present invention;

FIG. 6c is a circuit diagram of an intermediate filter in accordance with an embodiment of the present invention.

DETAILED DESCRIPTION

The primary embodiments of the invention will now be discussed in detail, examples of which are illustrated in the accompanying figures. Illustrated embodiments are presented by way of example and are not to be construed as limitations. All alternatives, modifications, and equivalents that fall within the scope and spirit of the invention are incorporated herein. For example, it is understood by a person of ordinary skill in the art that a transformer may be used in place of a cascade voltage multiplier to achieve the same increased voltage output.

Embodiments of the present invention may be employed in combination with other circuit designs, such as those that require a stable high voltage reference. This description is presented with enough detail to provide an understanding of the present invention, and to enable one of ordinary skill in the art to build a precision, low drift, stacked voltage reference. This detailed description should not be construed to encompass all necessary materials in circuit production or operation.

Figure 1:
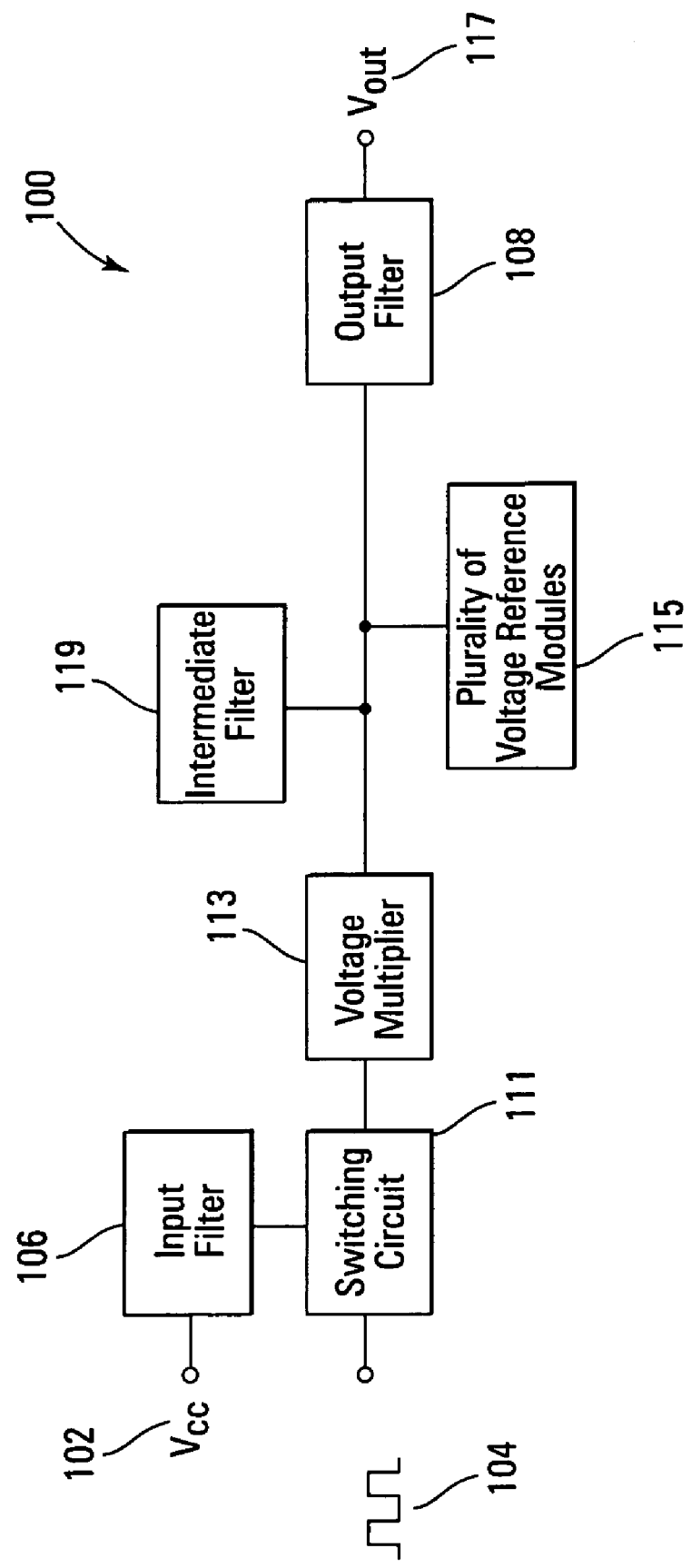
FIG. 1 is a block diagram of a stacked voltage reference circuit in accordance with an embodiment of the present invention.

Referring more particularly to the drawings, FIG. 1 illustrates a block diagram of a stacked voltage reference circuit 100 in accordance with an embodiment of the present invention. The stacked voltage reference circuit 100 comprises an input voltage 102, a time varying input signal 104, an input filter 106, output filter 108, and intermediate filter 119, a switching circuit 111, a voltage multiplier circuit 13, a plurality of voltage reference modules 115, and a voltage output 117. For purposes of the present invention, the plurality of voltage reference modules 15 comprises voltage reference modules that are stackable. In one embodiment, input voltage 102 comprises a standard constant voltage source. In one embodiment the voltage source provides a constant +/−15 volts. Standard voltage sources have a five percent error, therefore the voltage provided may be 15+/− 0.75 volts.

The input voltage 102 travels through the input filter 106 to attenuate or eliminate any initial noise or irregularities generated by the voltage source. The filtered input voltage 102 and time varying input signal 104 are both received by the switching circuit 111. The switching circuit 111 generates an AC output based on these DC signals and sends it to the voltage multiplier circuit 113. A voltage multiplier circuit 113 is a passive circuit, for example, a collection of passive devices such as capacitors, and diodes, arranged to produce a multiple of the input voltage at the output. The voltage multiplier circuit 113 steps up the voltage above the level of the input voltage 102 according to the circuit design, and outputs the multiplied voltage, which constitutes a direct current voltage. In one embodiment, the multiplied voltage is subsequently filtered by an intermediate filter 119, before being input into a plurality of voltage reference modules 115. The plurality of voltage reference modules 115 is a plurality of precision voltage reference modules coupled to one another in series. For example, where the plurality of voltage reference modules 115 comprises three precision voltage reference modules, the output of the first precision voltage reference module is connected to the input of the second precision voltage reference module, and the output of the second precision voltage reference module is connected to the input of the third precision voltage reference module. A precision voltage reference module is a device or circuit that generates a stable voltage output, even where the precision voltage reference module's input is not stable. The voltage generated by the plurality of voltage reference modules 115 is finally sent through an output filter 108 to reduce any ripple or noise that was generated by the circuit or by interactions with nearby circuits. The result is a stable, precise, high voltage output 117 that can be used as a reference voltage.

Figure 2:
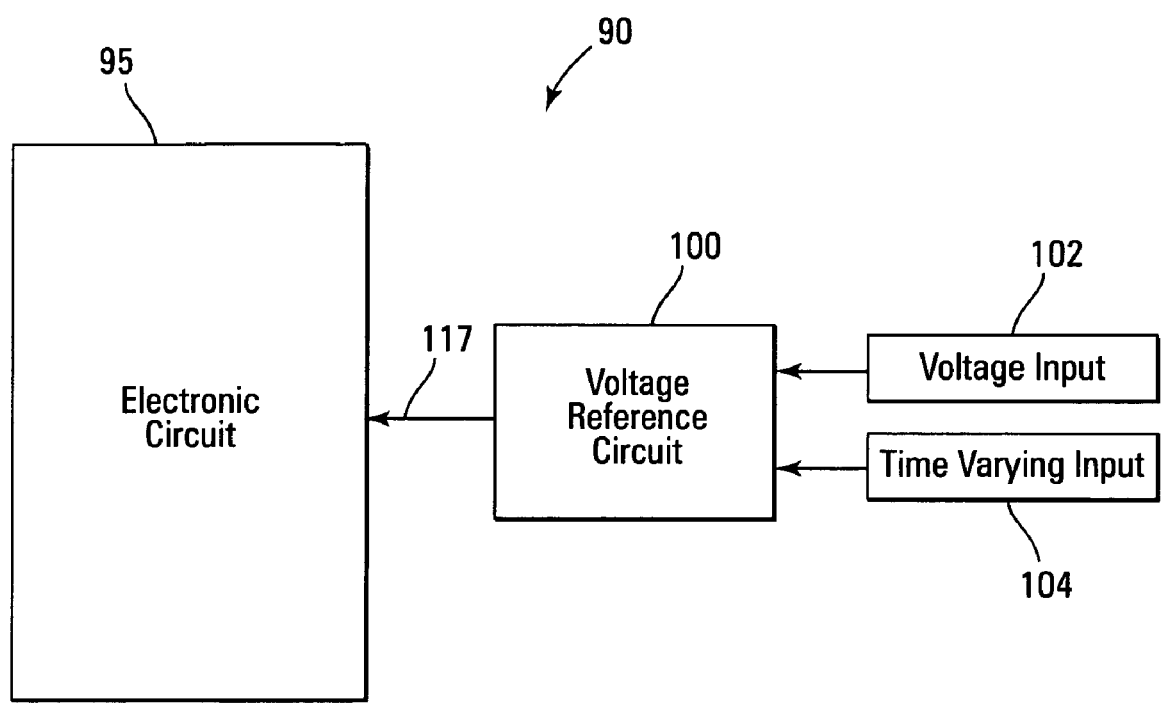
FIG. 2 is a block diagram of an electronic device in accordance with an embodiment of the present invention.

FIG. 2 is a block diagram of an electronic device, shown generally at 90. The electronic device 90 comprises an electronic circuit 95 connected to a voltage reference circuit 100. The voltage reference circuit 100 receives a voltage input 102 and a time varying input signal 104, from which it generates a stable, precise, high voltage output 117 that is input into the electronic circuit 95. In one embodiment the electronic circuit 95 comprises a sensor circuit and the electronic device 90 comprises a sensor, such as a Micro-Electro-Mechanical System (MEMS) inertial sensor.

Figure 3:
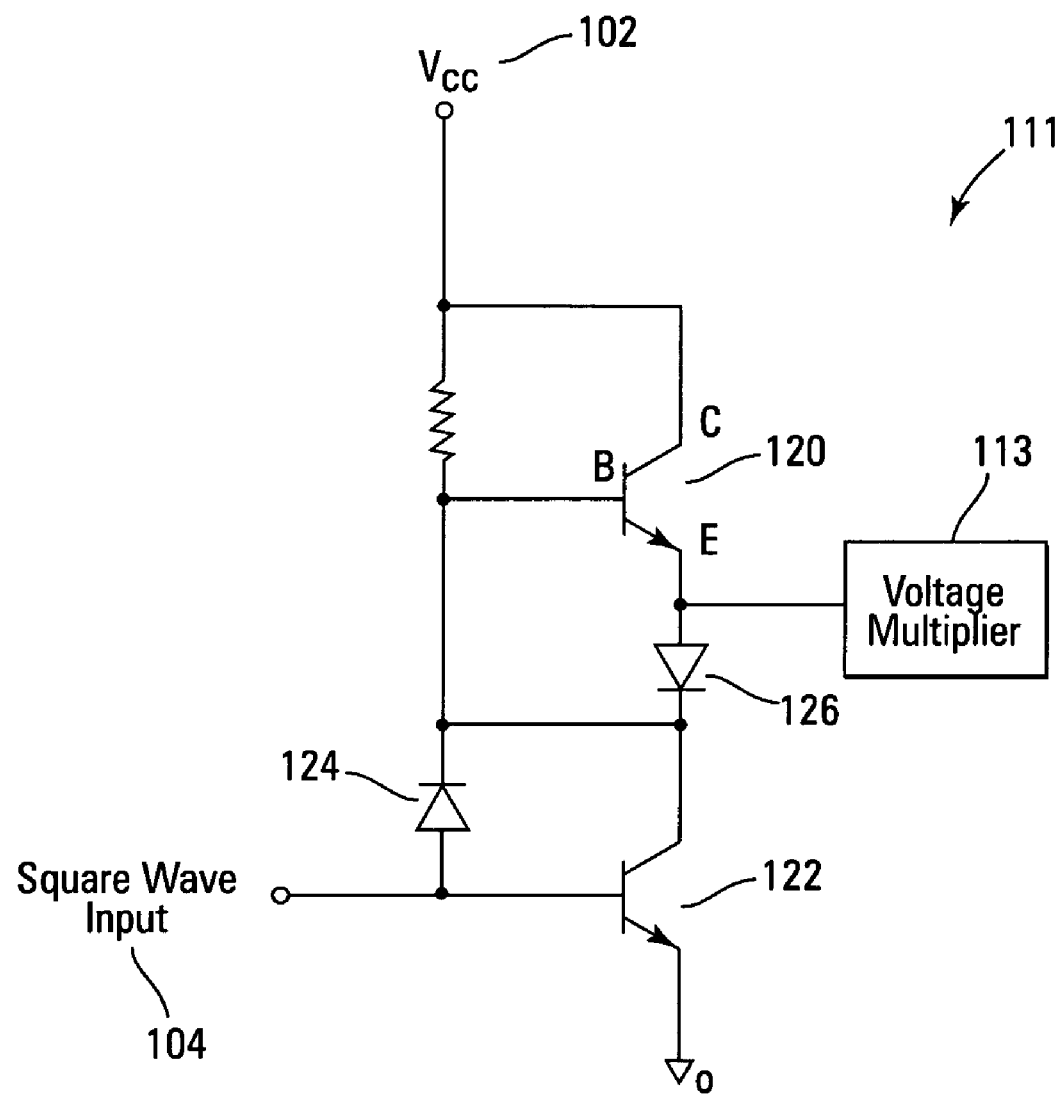
FIG. 3 is a circuit diagram of a switching circuit in accordance with an embodiment of the present invention.

FIG. 3 is a circuit diagram of a switching circuit 111 in accordance with an embodiment of the present invention. The switching circuit 111 is used to generate an AC voltage output from a DC voltage input. This process is referred to as voltage conversion. In one embodiment the switching circuit 111 achieves voltage conversion through the use of a first NPN junction transistor 120 and a second NPN junction transistor 122. A time varying input signal 104 and input voltage 102 are introduced into the circuit as shown. In one embodiment, the time varying input signal 104 comprises a square wave input. In other embodiments, the time varying input signal 104 comprises a triangle wave input, or a sinusoidal input. The time varying input signal 104 is a pulse train or clock whose frequency is selected from a range of frequencies, for example, between 125 kHz and 500 KHz. At 500 KHz the voltage multiplier circuit 113 will have better voltage regulation, that is, the voltage does not drop off rapidly as a function of output current. However, the higher frequency has the drawback of generating additional noise that can couple into surrounding electronics, having an adverse affect on the precision of the reference voltage. At 125 KHz, the voltage multiplier circuit 113 generates less noise, but provides less stable voltage regulation. These competing features create a system tradeoff, wherein the user must balance the need for precision of the voltage reference and the need to regulate the voltage emerging from the voltage regulator. In one embodiment, the pulse train has a frequency of 250 KHz.

The time varying input signal 104 may alternate, for example, between a negative and a positive voltage, or between zero volts and a positive voltage. In one embodiment the time varying input signal 104 comprises a square wave input that alternates between zero and five volts. When the time varying input signal 104 is at zero volts, a higher potential is applied to the base than the emitter of the first NPN junction transistor 120, and it is activated, inserting fifteen volts into the voltage multiplier circuit 113. Meanwhile the second NPN junction transistor 122 remains off. When the time varying input signal 104 is at five volts, the potential at the emitter of the first NPN junction transistor 120 is greater than the potential at its base, turning it off. Simultaneously, the second NPN junction transistor 122 is activated, and the input voltage 102 is grounded. Thus no charge is applied to the voltage multiplier circuit 113. A first diode 124 ensures that the second NPN junction transistor 122 remains inactive while the time varying input signal 104 is at zero, and a second diode 126 ensures that the voltage multiplier circuit 113 does not receive any charge when the time varying input signal 104 is at five volts.

Figure 4:
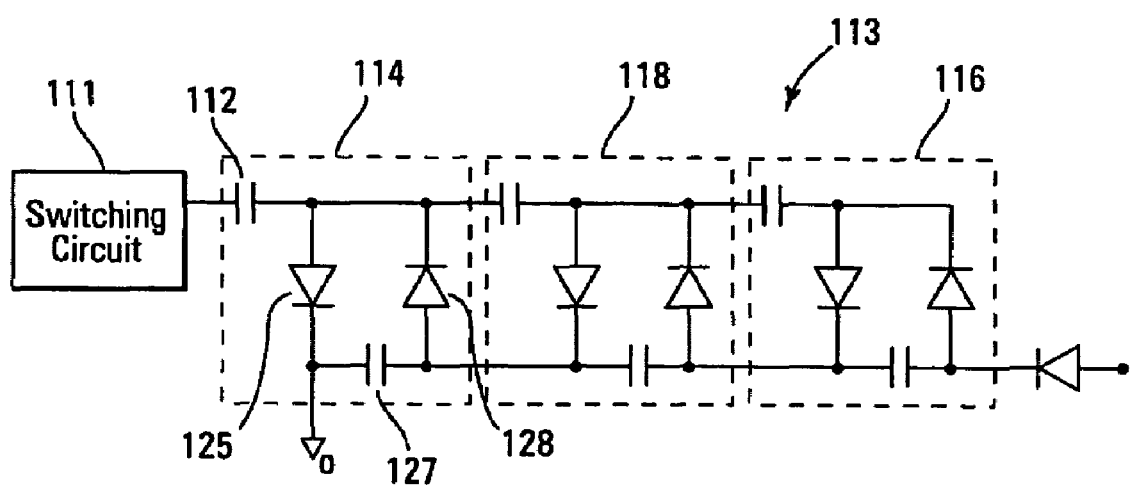
FIG. 4 is a circuit diagram of a voltage multiplier circuit in accordance with an embodiment of the present invention.

FIG. 4 depicts a circuit diagram of one embodiment of a voltage multiplier circuit 113 in connection with the switching circuit 111. In the illustrated embodiment, the voltage multiplier circuit 113 comprises a first stage 114 a second stage 118, through an nth stage 116. Each stage comprises a primary capacitor 112, a primary diode 125, a secondary capacitor 127, and a secondary diode 128. The alternating current introduced by the switching circuit 111 successively charges the primary capacitor 112 to the input voltage 102 through the primary diode 125 then the secondary capacitor 127 to twice the input voltage 102 through the secondary diode 128. The charges of the secondary capacitors 127 are then added in series to generate a theoretical 2 n times the input voltage 102, where n is the number of stages. Depending on the arrangement of the diodes and capacitors, the output voltage is either the same polarity or the opposite polarity as the input voltage 102. In the arrangement shown, the output voltage is the opposite polarity to the input voltage. In one embodiment, the value of capacitance of each capacitor in the voltage multiplier circuit 113 is the same. In other embodiments, the value of at least some capacitors differs. For example, advantageously, in one embodiment, capacitors with a higher capacitance are used in earlier stages of the voltage multiplier circuit 113, and capacitors with lower capacitance are used in the later stages. This varying of capacitor values is designed to reduce ripple in the output voltage, which is commonly produced by voltage multiplier circuits 113.

Due to their nature, voltage multiplier circuits 113 are generally used to generate high voltages with low currents. As the voltage is stepped up, the current is necessarily decreased. The fewer stages that are used to increase the voltage, the less the current drops. Therefore, there is a design tradeoff between necessary voltage and necessary current. In some embodiments, the capacitors of different stages are arranged in series. In alternative embodiments, the capacitors of different stages are arranged such that they share common connections. Arranging the capacitors of different stages in series maximizes the voltage multiplication and consequently, the current drop. On the other hand, capacitors of different stages configured to share common connections produce a voltage multiplier circuit 113 that is better suited to applications where lower output voltages and higher currents are needed. When the capacitors are arranged to share common connections, they must have higher voltage ratings.

Voltage multiplier circuits 113 are generally small and light, and composed of relatively inexpensive components. They have the advantage that the voltage across each stage of the multiplier is at most only two times the input voltage. In addition to making the multiplier easy to insulate, and permitting the use of low cost components, this offers particular advantages in radiation rich environments. High voltage components are more susceptible to output changes due to radiation. For example, high voltage diodes and transistors are lightly doped, whereas low voltage diodes and transistors are heavily doped. Over time, exposure to radiation causes impurities to be introduced into the junctions of both the diodes and transistors. Where the diode or transistor is heavily doped, the percentage of impurities is relatively low, and therefore has a minimal effect. However, where the diode or transistor is lightly doped, the percentage of impurities is high, which causes leakage across the junction, and decreases the effectiveness of the component. Therefore low voltage components are preferable in devices that will be exposed to high levels of radiation.

Ideally a voltage multiplier circuit 113 doubles the input voltage 102 at each stage. For example, a single stage voltage multiplier circuit 113 would generate two times the input voltage 102, a two stage multiplier would generate four times the input voltage 102, a three stage multiplier would generate six times the input voltage 102, and so on. However, once a load is attached, the output voltage is reduced. Minor fluctuations in the load impedance also produce large fluctuations in the output voltage. Additionally, electrical components are not ideal, and therefore each component introduces its own impedance, further reducing the generated voltage. For example a standard diode drops the voltage across it by six tenths of a volt. The voltage loss within the multiplier becomes increasingly large as further stages are added. The possibility of voltage arcing also increases with the introduction of additional stages. Therefore the actual output from the voltage multiplier circuit 113 may be less than 2n times the voltage input 102.

In an alternative embodiment, the voltage reference circuit 100 is adapted such that voltage can be drawn from any stage of the voltage multiplier circuit 113. Depending on the present needs of the circuit, it can draw voltage from, for example, the first stage 114 if only twice the input voltage 102 is required, or the second stage 118 if four times the input voltage 102 is required. This increases the versatility of a single circuit.

In further alternative embodiments, a step up transformer is used as the voltage multiplier circuit 113 to increase the input voltage to the necessary value. Advantageously, a transformer typically produces less ripple than other multiplier circuits, and thus circuits using a transformer may require less complex filters.

Figure 5:
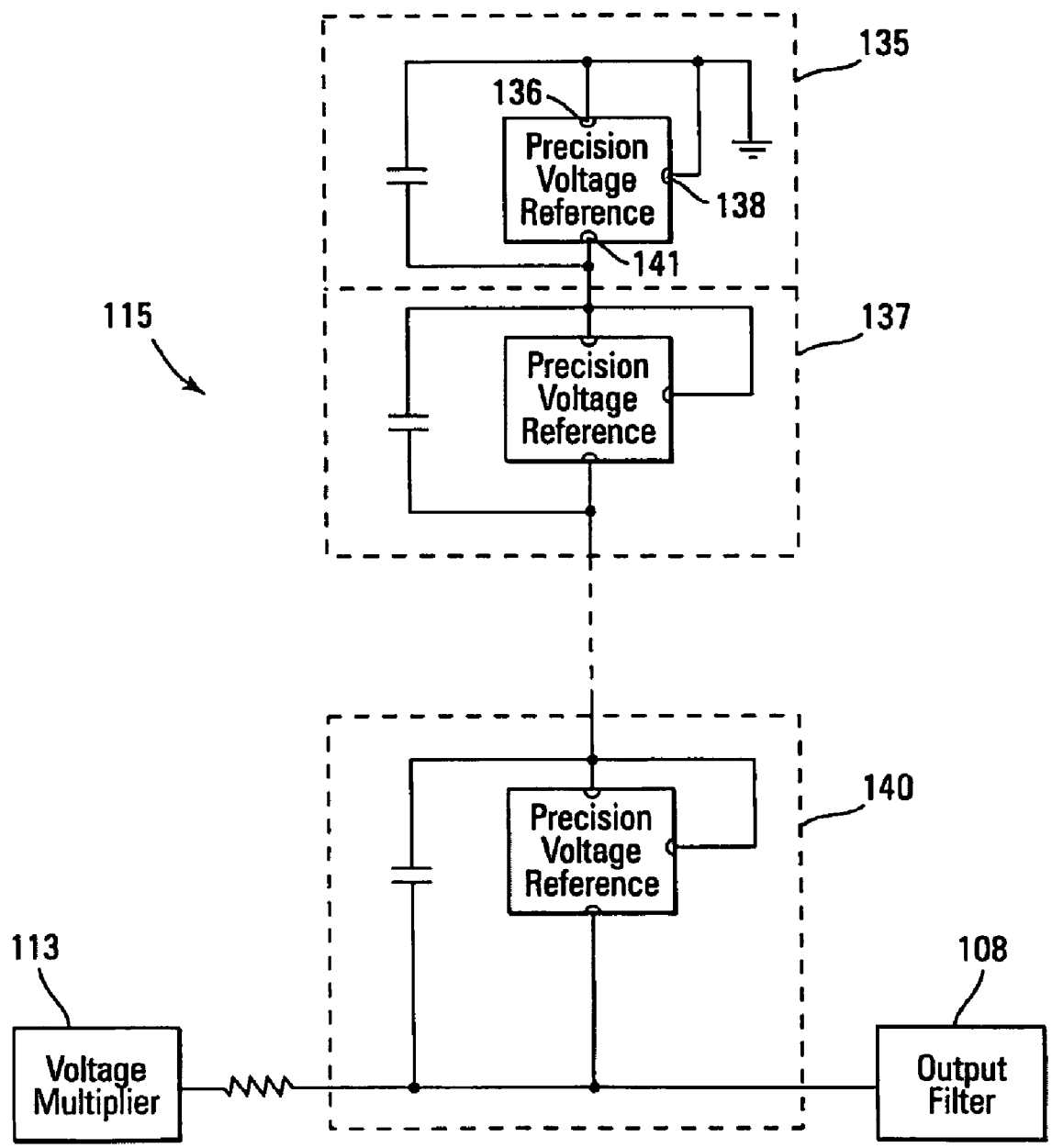
FIG. 5 is a circuit diagram of a plurality of voltage reference modules, coupled to form a voltage reference stack, in accordance with an embodiment of the present invention.

To enable the stacked voltage reference circuit 100 to be able to maintain a constant voltage even over changes in temperature, or in individual component characteristics over time, a plurality of voltage reference modules 115 is implemented in some embodiments. FIG. 5 illustrates one embodiment of a plurality of voltage reference modules 115 in accordance with the present invention. As illustrated, the plurality of voltage reference modules 15 is stacked. In one embodiment, a plurality of voltage reference modules 115 comprises a first precision voltage reference module 135, a second precision voltage reference module 137, through an nth precision voltage reference module 140. In one embodiment, each precision voltage reference module in the stack has a first input terminal 136, a second input terminal 138, and an output terminal 141. The first and second input terminals, 136 and 138 respectively, share a common connection and are connected to the output terminal 141 through a capacitor. The inputs of one precision voltage reference module are in electrical contact with the output of the preceding precision voltage reference module. For example, the inputs for the second precision voltage reference module 137 receive a potential from the output of the first precision voltage reference module 135.

For each precision voltage reference module, the potential at its inputs is its reference, to which it adds its own reference voltage value. In one embodiment, each precision voltage reference module consists of only three terminals and provides a precise output from an unregulated input. In one embodiment, the precision voltage reference modules are temperature stable monolithic bandgap voltage references, for example, AD581's. The first precision voltage reference module 135 has an input from ground, and therefore outputs negative ten volts. The second precision voltage reference module 137 receives the negative ten volts as its reference, and so outputs negative twenty volts. The nth precision voltage reference module 140 then receives −10 (n−1) volts and outputs −10 n volts. The plurality of voltage reference modules 115 is powered by the magnified voltage output from the voltage multiplier circuit 113. The nth precision voltage reference module 140 receives the magnified voltage at its output terminal. The voltage difference between its output terminal and input terminal provides the necessary current to power the precision voltage reference module. In order for the plurality of voltage reference modules 115 to function properly, the voltage provided to the nth precision voltage reference module's 140 output terminal must be more negative (for embodiments in which a positive output is required, the voltage provided to the output terminal would need to be more positive) than the nth precision voltage reference module's 140 input by enough to provide current to the entire stack.

In one embodiment any combination of precision voltage reference modules may be used, so that the output of the plurality of voltage reference modules 115 may be any arbitrary predetermined value. For example a two volt reference module, a five volt reference module, and a ten volt reference module may be stacked such that they output seventeen volts. Precision voltage reference modules may be combined so that they stack to provide a negative output, or stack to provide a positive output. In the illustrated embodiment the precision voltage reference modules are arranged to provide a negative output. In one embodiment, a change in combined voltage output of the voltage reference modules necessitates modifying the values of the associated resistors, and the values, sizes, and quantities of at least some surrounding capacitors. In one embodiment, the voltage generated by the plurality of voltage reference modules 115 finally passes through an output filter 108. A filter is a circuit or circuit element that alters the amplitude and/or phase characteristics of an electronic signal with respect to frequency. The output filter 108 is used generally to filter out noise generated by the circuit. More specifically, voltage multiplier circuits 113 commonly emit a ripple, whose effects increase as further stages are added to the multiplier. In some embodiments, a filter is inserted to ameliorate or eliminate this ripple, In some embodiments, an input filter 106 is also inserted to filter the input voltage 102 before it enters the switching circuit 111, and an intermediate filter 119 is inserted parallel to the voltage multiplier circuit's 113 output. In some embodiments, the input filter 106, intermediate filter 119, and output filter 108 are substantially the same, while in other embodiments they have different configurations. FIGS. 6a, 6b, and 6c illustrate circuit diagrams of one possible configuration of an input filter 106, an output filter 108, and an intermediate filter 119, respectively, in accordance with an embodiment of the present invention. The illustrated embodiments depict passive filters, made up of only passive elements such as capacitors 152, inductors 154, and resistors 156. Passive filters share a number of advantages. Because passive filters have no active elements, they do not require a power supply. They may also be used at high frequencies and at high voltage and current. However, passive filters are not capable of supplying any gain, which may be required in certain circuit configurations.

In alternative embodiments, the filters comprise active filters. Active filters use amplifying elements such as op amps, along with capacitors and resistors, to perform substantially the same function as passive filters. Active filters have the advantage that they can introduce gain into the signal, and they are generally easier to design than passive filters.

Figure 7:
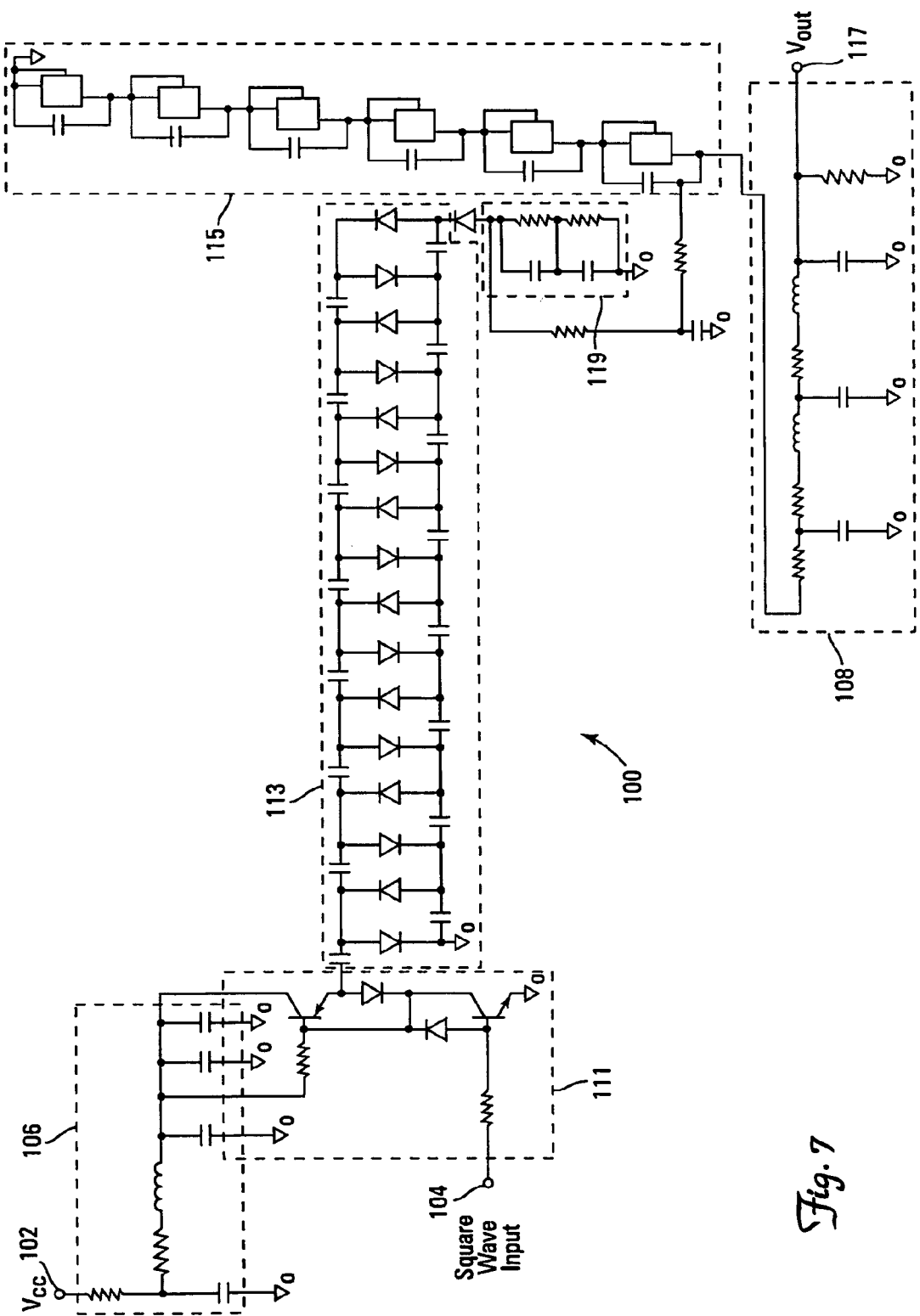
FIG. 7 is a circuit diagram of a stacked voltage reference circuit in accordance with an embodiment of the present invention.

FIG. 7 shows a circuit diagram of one possible configuration of a stacked voltage reference circuit 100 in accordance with an embodiment of the present invention. Where possible, the same reference numbers are used for the same or like components as in previous figures. An input voltage 102 of fifteen volts first travels through an input filter 106 to a switching circuit 111. The switching circuit 111 receives the filtered input voltage 102 and a 250 kHz square wave input 104 that may be generated by a field programmable gate array, and generates an alternating current. The alternating current is received by the voltage multiplier circuit 113, comprising an eight stage voltage multiplier circuit 113. The voltage multiplier circuit 113 then outputs a voltage at approximately negative seventy five volts, which is filtered by an intermediate filter 119. The plurality of voltage reference modules 115 comprises six stacked voltage reference modules, each voltage reference module comprising an AD581 voltage reference and a capacitor. The plurality of voltage reference modules 115 receives the approximately negative seventy five volts and outputs negative sixty volts. In one embodiment the output voltage has a tolerance of three hundred millivolts. Each of the illustrated filters comprise passive filters.

In view of the foregoing, it will be understood by those skilled in the art that the methods of the present invention can be used in conjunction with other electronic circuits and networks. The above embodiments have been presented by way of example and not by way of limitation. Variations and modifications may occur, which fall within the scope of the present invention, as set forth in the following claims.

What is claimed is:

1. A voltage reference circuit comprising:
   a first port, adapted to receive an input voltage;
   a second port, adapted to receive a time varying input signal;
   a switching circuit, responsive to the first and second ports, the switching circuit generating an AC signal from the input voltage;
   a voltage multiplier circuit, coupled to the switching circuit to receive the AC signal and to create a DC signal with a selected voltage level, wherein the voltage multiplier circuit comprises a plurality of multiplying stages having at least one capacitor in each stage, the at least one capacitor at one or more early stages having a different capacitance than the at least one capacitor at one or more later stages; and
   a plurality of voltage reference modules, coupled together to form a voltage reference stack, and coupled to the voltage multiplier circuit to maintain the DC signal at a precise reference voltage.

2. The voltage reference circuit of claim 1, wherein each multiplying stage is comprised of two capacitors and two diodes.

3. The voltage reference circuit of claim 1, wherein at least one of the capacitors of the voltage multiplier circuit has the same capacitance as at least one of the other capacitors.

4. The voltage reference circuit of claim 1, wherein the at least one capacitor of the voltage multiplier circuit at one or more early stages has higher capacitance and the at least one capacitor at one or more later stages has lower capacitance.

5. The voltage reference circuit of claim 2, wherein the two capacitors of each stage comprise a primary capacitor and a secondary capacitor, the primary capacitors of different stages are in series and the secondary capacitors of different stages are in series.

6. The voltage reference circuit of claim 2, wherein the two capacitors of each stage comprise a primary capacitor and a secondary capacitor, the primary capacitors of each of the multiplying stages shares a common connection with at least one other primary capacitor and the secondary capacitor of each of the multiplying stages shares a common connection with at least one other secondary capacitor.

7. The voltage reference circuit of claim 2, wherein the selected voltage level is taken from a chosen stage of the voltage multiplier circuit.

8. The voltage reference circuit of claim 1, wherein a diode is used to ensure that only the desired voltage polarity is output from the voltage multiplier circuit.

9. The voltage reference circuit of claim 1, wherein the voltage multiplier circuit comprises a step up transformer.

10. The voltage reference circuit of claim 1, wherein the time varying input signal is selected from a list comprising a square wave input, a sinusoidal input, and a triangle wave input.

11. The voltage reference circuit of claim 1, wherein the time varying input signal has a frequency chosen from a list of frequencies ranging from 125 kHz to 500 kHz.

12. The voltage reference circuit of claim 1, wherein the plurality of voltage reference modules are connected in series, and each of the plurality of voltage reference modules comprises a precision voltage reference module.

13. The voltage reference circuit of claim 12, wherein each of the plurality of voltage reference modules comprises a three terminal monolithic bandgap precision voltage reference module that provides a precise, temperature stable output.

14. The voltage reference circuit of claim 13, wherein each of the plurality of voltage reference modules consists of the same precision voltage reference module.

15. An electronic device comprising an electronic circuit attached to a voltage reference circuit, wherein the voltage reference circuit comprises:
   a first port adapted to receive an input voltage;
   a second port adapted to receive a time varying input signal;
   a switching circuit, responsive to the first and second ports, the switching circuit generating an AC signal from the input voltage;
   a voltage multiplier circuit, coupled to the switching circuit to receive the AC signal and to create a DC signal with a selected voltage level; and
   a plurality of bandgap precision voltage reference modules, coupled together to form a voltage reference stack, and coupled to the voltage multiplier circuit to maintain the DC signal at a precise reference voltage.

16. The electronic device of claim 15, wherein the electronic device is a sensor.

17. The electronic device of claim 16, wherein the sensor is a MEMS inertial sensor.

18. The electronic device of claim 15, wherein the voltage reference circuit further comprises a plurality of filters.

19. The electronic device of claim 15, wherein the voltage reference circuit comprises low voltage components, and wherein active components are highly doped.

20. The electronic device of claim 15, wherein the voltage reference circuit further comprises radiation shielding attached to the voltage reference circuit such that the radiation shielding insulates the voltage reference circuit from external radiation.

21. The electronic device of claim 15, wherein the voltage reference circuit is adapted for use in a radiation rich environment.

22. A method for supplying an output reference voltage comprising:
   generating an alternating current signal from a direct current input voltage and time varying input signal by means of a switching circuit;
   generating a DC voltage signal from the alternating current signal that is greater in magnitude than the direct current input voltage; and
   maintaining the DC voltage signal at a precise reference voltage with a plurality of stacked bandgap precision voltage reference modules, wherein the precise reference voltage is the output reference voltage.

23. The method of claim 22, wherein generating the DC voltage signal comprises generating the DC voltage signal in a voltage multiplier circuit.

24. A voltage reference apparatus comprising:
a switching circuit that generates an AC signal from a DC input and a time varying input signal;
a voltage multiplier circuit, coupled to the output of the switching circuit, that receives the AC signal and generates a DC signal with a selected voltage level; and
a plurality of bandgap precision voltage reference modules, coupled together to form a voltage reference stack, and coupled to the voltage multiplier circuit, that maintains the DC signal at a precise reference voltage.

25. The voltage reference apparatus of claim 24, wherein the DC signal generated by the voltage multiplier circuit is higher than the AC signal generated by the switching circuit.

26. The voltage reference apparatus of claim 24, wherein the switching circuit comprises at least two transistors that are activated alternatively.

27. The voltage reference apparatus of claim 24, wherein the voltage multiplier circuit comprises a plurality of voltage multiplication stages, and wherein the plurality of voltage multiplication stages are stacked in series.

28. The voltage reference apparatus of claim 24, wherein the plurality of voltage reference modules are connected in series, and each of the plurality of voltage reference modules comprises a three terminal monolithic bandgap precision voltage reference module.

29. A voltage reference circuit comprising:
a first port, adapted to receive an input voltage;
at least one input filter, coupled to the first port, that filters the input voltage;
a second port, adapted to receive a time varying input signal;
a switching circuit, responsive to the first and the second ports, the switching circuit generating an ac signal from the input voltage;
a voltage multiplier circuit, coupled to the switching circuit to receive the ac signal and to create a DC signal with a selected voltage level;
at least one intermediate filter, coupled to the voltage multiplier circuit that filters the DC signal with the selected output voltage level;
a plurality of voltage reference modules, coupled together to form a voltage reference stack, and coupled to the voltage multiplier circuit, that maintains the filtered DC signal at a precise reference voltage;
an output port, coupled to the voltage reference stack, that is adapted to provide the filtered DC signal maintained at the precise reference voltage as a regulated output voltage; and
at least one output filter, coupled to the output port, that filters the regulated output voltage.

30. The voltage reference circuit of claim 29, wherein the input filter, intermediate filter, and output filter comprise passive filters.

31. A voltage reference apparatus comprising:
a switching circuit that generates an AC signal from a DC input and a time varying input signal;
a voltage multiplier circuit, coupled to the output of the switching circuit, that receives the AC signal and generates a DC signal with a selected voltage level;
a plurality of voltage reference modules, coupled together to form a voltage reference stack, and coupled to the voltage multiplier circuit, that maintains the DC signal at a precise voltage output at an output port; and
a plurality of filters, coupled to the voltage reference apparatus at one or more locations, wherein the plurality of filters comprises at least one input filter, at least one intermediate filter, and at least one output filter, the at least one input filter coupled to the DC input, the at least one intermediate filter coupled to an output end of the voltage multiplier circuit, and the at least one output filter coupled to the output port.

32. A method for supplying a precise reference voltage comprising:
introducing a direct current input voltage;
filtering the direct current input voltage;
introducing a time varying input signal;
generating an alternating current signal from the filtered direct current input voltage and the time varying input signal;
generating a DC voltage signal from the alternating current signal that is greater in magnitude than the direct current input voltage;
filtering the generated DC voltage signal;
maintaining the filtered DC voltage signal at the precise reference voltage with a plurality of stacked bandgap precision voltage reference modules; and
delivering the filtered DC signal maintained at the precise reference voltage.

* * * * *